United States Patent [19]
Yuen et al.

[11] Patent Number: 5,543,852
[45] Date of Patent: Aug. 6, 1996

[54] APPARATUS AND METHODS FOR AVOIDING LOSS OF CLOSED CAPTION DATA WHEN USING EXTENDED DATA SERVICES

[75] Inventors: Henry C. Yuen, Redondo Beach; Daniel S. Kwoh, La Canada; Wing P. Leung, Arcadia; Tony T. Tam, Hawthorne, all of Calif.

[73] Assignee: Index Systems, Inc., Virgin Islands (Br.)

[21] Appl. No.: 265,709

[22] Filed: Jun. 24, 1994

Related U.S. Application Data

[63] Continuation-in-part of Ser. No. 253,153, Jun. 2, 1994.
[51] Int. Cl.$^6$ ...................................................... H04N 7/088
[52] U.S. Cl. .............................................................. 348/478
[58] Field of Search ..................................... 348/478, 563, 348/476, 473, 468; H04N 7/87, 7/88

[56] References Cited

U.S. PATENT DOCUMENTS

| | | | |
|---|---|---|---|
| 4,855,827 | 8/1989 | Best | 348/478 |
| 5,237,412 | 8/1993 | Nakajima | 348/478 |
| 5,347,318 | 9/1994 | Kobayashi | 348/478 |
| 5,371,545 | 12/1994 | Tults | 348/478 |

Primary Examiner—Victor R. Kostak
Attorney, Agent, or Firm—Christie, Parker & Hale, LLP

[57] ABSTRACT

Apparatus and methods are provided for inserting data into a vertical blanking interval (VBI) line of video frames. The method includes the steps of inserting first data into a first vertical blanking interval VBI line for a plurality of consecutive video frames, inserting second data into a second vertical blanking interval VBI line for a plurality of consecutive video frames, counting a number of consecutive video frames having first data inserted into the first vertical blanking interval VBI line, terminating the insertion of first data for a first number of video frames before again inserting first data into the first vertical blanking VBI interval line when the counted number of consecutive video frames into which first data is inserted into the first vertical blanking interval VBI line equals a second number, and repeating the steps. In a specific embodiment the method includes the steps of detecting when the insertion of second data into the second vertical blanking interval VBI line terminates, and terminating for a second number of video frames the insertion of first data into the first vertical blanking interval VBI line upon detecting the termination of insertion of the second data into the second vertical blanking interval VBI line. Another method for inserting data into VBI lines includes the steps of testing whether data is being inserted into a first VBI line, and inserting any data into VBI lines adjacent to the first VBI line in 2X format rather than 1X format, if data is being inserted into the first VBI line.

30 Claims, 13 Drawing Sheets

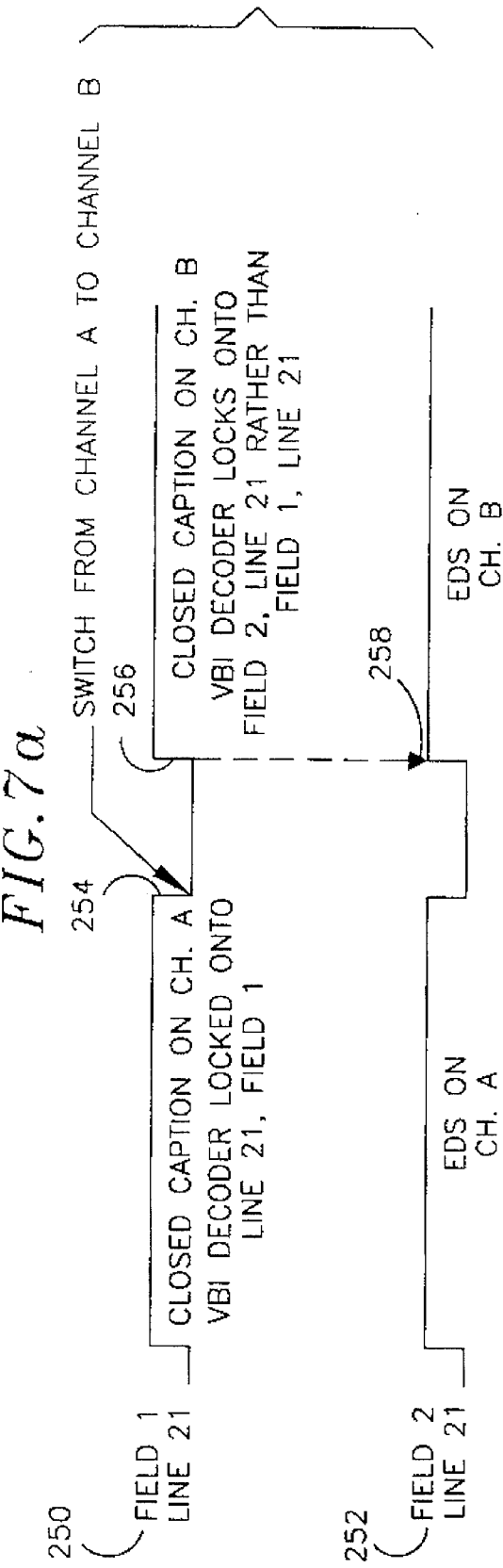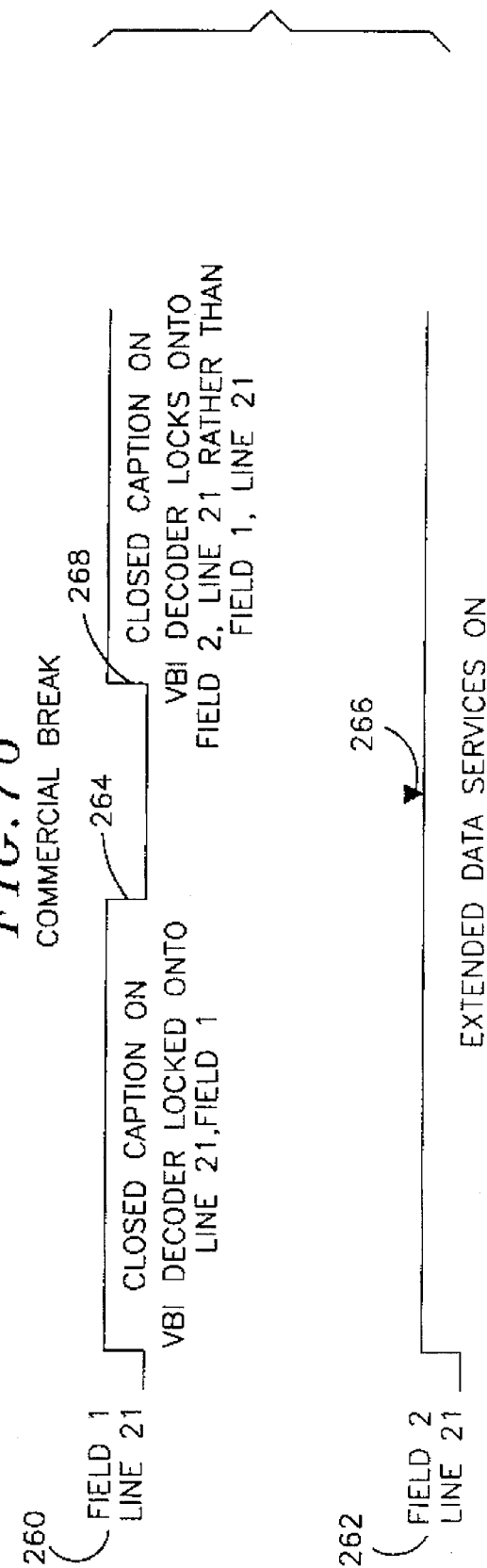

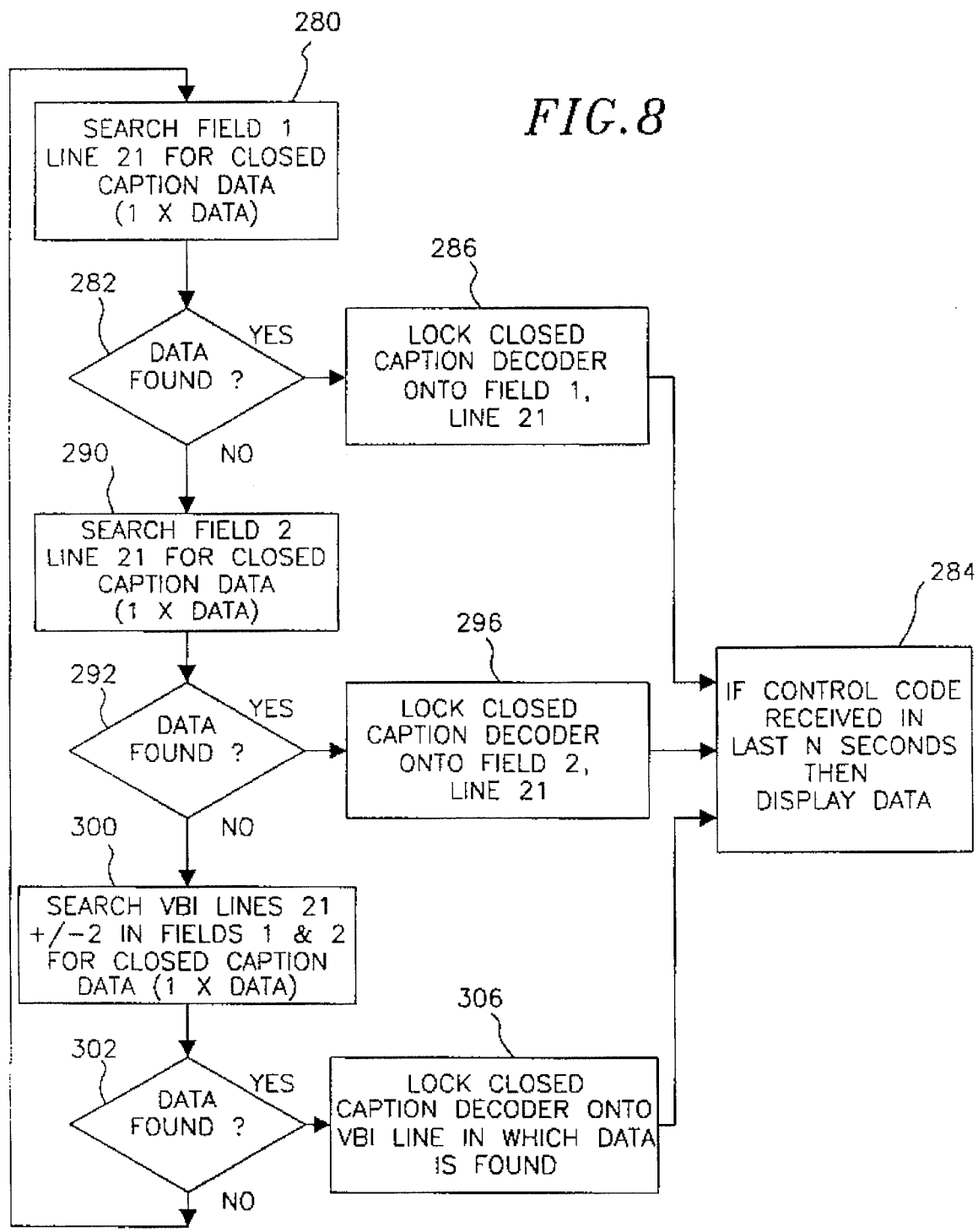

APPARATUS AND METHODS FOR AVOIDING LOSS OF CLOSED CAPTION DATA WHEN USING EXTENDED DATA SERVICES

BACKGROUND OF THE INVENTION

This is a continuation-in-part of pending U.S. patent application Ser. No. 08/253,153, filed Jun. 2, 1994. The subject matter of the above-referenced patent application is incorporated herein by this reference as though set forth in full.

FIELD OF THE INVENTION

This invention relates generally to television closed captioning for the hearing impaired and in particular to methods and apparatus for avoiding loss of closed caption data when using extended data services.

DESCRIPTION OF THE RELATED ART

Closed caption data for the hearing impaired is transmitted in television broadcasts in the vertical blanking interval lines. The closed capture data is extracted from the vertical blanking interval lines by a vertical blanking interval (VBI) line slicer and a closed caption decoder at a television receiver and then a character generator is used to generate characters that are displayed on the television monitor. The closed caption data is transmitted in field 1, vertical blanking interval line 21, as explained below. Also as explained below, extended data services (EDS) data can be transmitted in field 2, vertical blanking interval line 21.

When a user changes channels or a commercial break occurs, closed caption data is temporarily interrupted. During this interruption there is a chance that the vertical blanking interval slicer and closed caption decoder will lock onto the extended data services (EDS) data in field 2, line 21 and not lock onto the closed caption data when transmission of the closed caption data is resumed. If the EDS data is continuous, the VBI line slicer and closed caption decoder will remain locked onto the EDS data. The result is that the closed caption data is lost and junk may be displayed on the television monitor.

One solution is to fill in null bytes between closed caption data so that during commercial breaks and other gaps in transmission, the closed caption data is continuous. However, there is still a 50 percent chance that the VBI line slicer and closed caption decoder may lock onto data in field 2, line 21, when channel switching occurs.

Another problem is that if data (in closed caption or EDS format) is transmitted in VBI lines 19, 20, 22 or 23 adjacent to closed caption data, the VBI line slicer and closed caption decoder may seek out such data and lock onto it when a commercial break or channel switching occurs. This also results in the loss of closed caption data and junk may be displayed on the television monitor.

SUMMARY OF THE INVENTION

In accordance with the invention, apparatus and methods are provided for inserting data into a vertical blanking interval line of video frames. The method includes the steps of inserting first data into a first vertical blanking interval line for a plurality of consecutive video frames, inserting second data into a second vertical blanking interval line for a plurality of consecutive video frames, counting a number of consecutive video frames having first data inserted into the first vertical blanking interval line, terminating the insertion of first data for a first number of video frames before again inserting first data into the first vertical blanking interval line when the counted number of consecutive video frames into which first data is inserted into the first vertical blanking interval line equals a second number, and repeating the steps. In a specific embodiment the method includes the steps of detecting when the insertion of second data into the second vertical blanking interval line terminates, and terminating for a second number of video frames the insertion of first data into the first vertical blanking interval line upon detecting the termination of insertion of the second data into the second vertical blanking interval line.

In another embodiment, the method includes the steps of testing whether data is being inserted into the second vertical blanking interval line, and inserting any data inserted into vertical blanking interval lines adjacent to the second vertical blanking interval line in 2X format rather than 1X format, if data is being inserted into the second vertical blanking interval line.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 7a is a timing diagram illustrating locking onto extended data services in field 2 line 21 rather than closed caption data when a channel is switched;

FIG. 7b is a timing diagram illustrating locking onto extended data services in field 2 line 21 rather than closed caption data when a commercial break occurs;

FIG. 8 is a flow diagram of a method used by a vertical blanking interval slicer when searching for closed caption data in a vertical blanking interval line;

DETAILED DESCRIPTION

Figure 1:
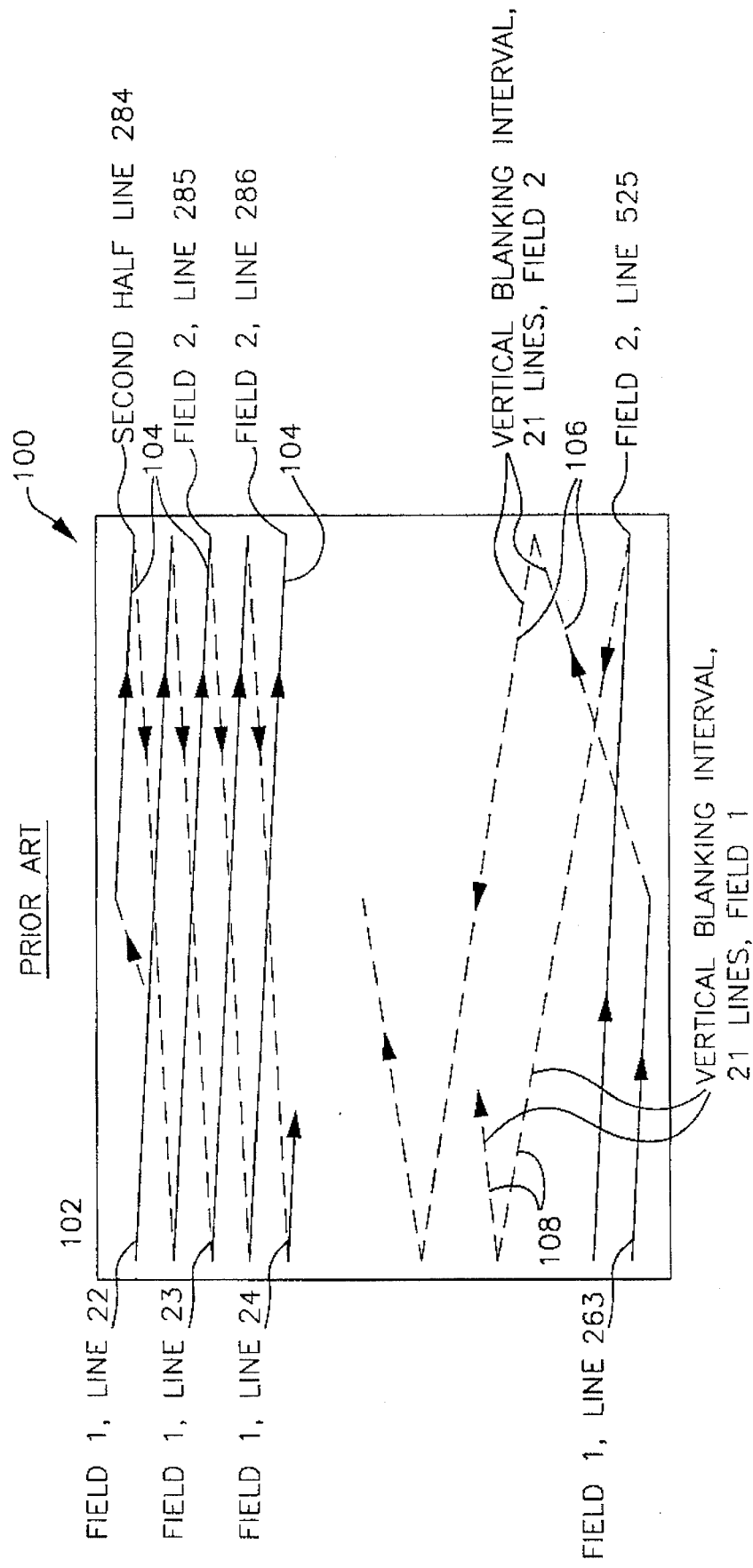
FIG. 1 is a schematic diagram illustrating an interlaced raster scanning pattern of a conventional television.

Video images in a cathode ray tube (CRT) type-video device, e.g. television, are generated by scanning a beam along a predefined pattern of lines across a screen. Each time all the lines are scanned, a frame is said to have been produced. In one implementation, such as used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every $1/30$ of a second in a process known as interlacing. Another standard in the world uses 625 lines of information and interlace 312 and 313 lines at 50 fields per second. In the 525 line standard used in the United States, approximately 480 lines are displayed on the television screen.

Referring now to the drawings, FIG. 1 is a schematic diagram illustrating the interlaced scanning pattern 100 on a screen of a conventional television receiver. A video display scans the beam from the top left hand corner and scans across the screen (line 22, field 1 in FIG. 1). After it finishes scanning the first line, the beam returns to the left hand side during a period known as a horizontal blanking interval and repeats scanning along another line which is parallel to but lower than the previous line (line 23, field 1 in FIG. 1). The scanning continues along the lines until the beam reaches the center of the bottom part of the screen (line 263, field 1) to complete field 1, which is comprised of lines 102.

From the bottom center of the screen, the beam returns to the top where it starts scanning from substantially the center of the screen along the lines 104 for field 2 which interlace the lines of field 1. This is not an instantaneous bottom to top jump but actually requires the length of time to scan 21 horizontal lines. These lines 106 are lines 1 through 21 of field 2. The second half of line 21 field two (line 284 as shown in FIG. 1) is displayed. Then lines 285 to 525 of field 2 are scanned to complete field 2. When the beam reaches the bottom, right hand corner of the screen, the picture frame is formed. Then the beam retraces to the top and the vertical blanking interval lines 108 are numbered 1 through 21 of field 1. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. In other words, the duration of the VBI is equal to the time for the beam to scan 21 lines and is divided into 21 lines. In interlaced scanning, the VBI is identified by the field with which it is associated. Apparatus and methods using the NTSC standard with 21 lines in each VBI are well known in the art and therefore are not discussed in detail herein.

Figure 3:
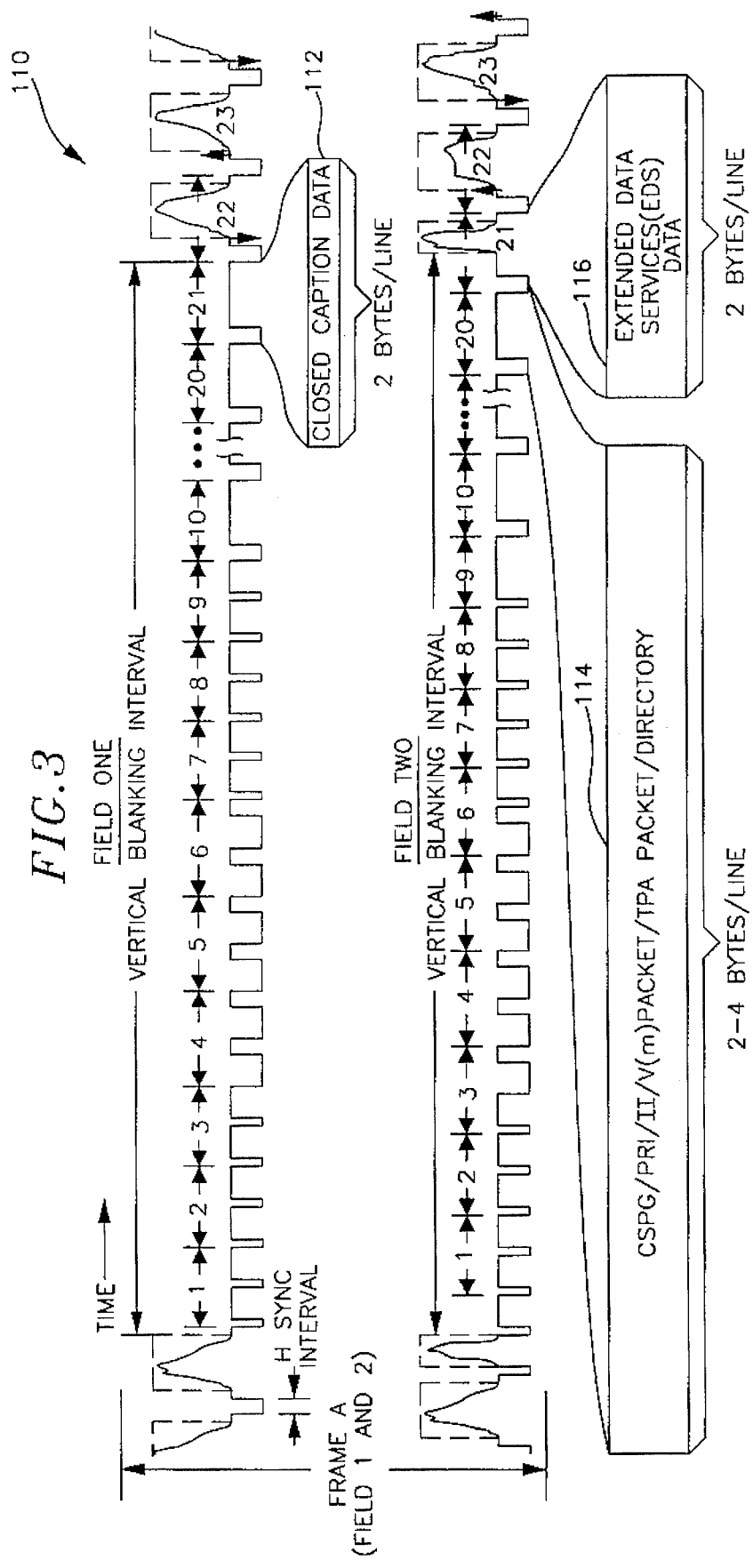
FIG. 3 is a timing diagram showing the vertical blanking interval (VBI) lines of field 1 and field 2.

Because no image is produced on the display during the vertical blanking interval, no picture information therefore needs to be carried by the broadcast signals. Thus, the VBI is used for conveying auxiliary information from a television network or station to an audience. For example, closed caption data associated with the television program are transmitted as encoded composite data signals in VBI line 21, field 1 of the standard NTSC video signal, as shown in FIG. 3.

Lines 1 through 9 of the VBI of each field are used for vertical synchronization and post equalizing pulses. Thus, lines 10 through 21 are available for auxiliary information.

Figure 2:
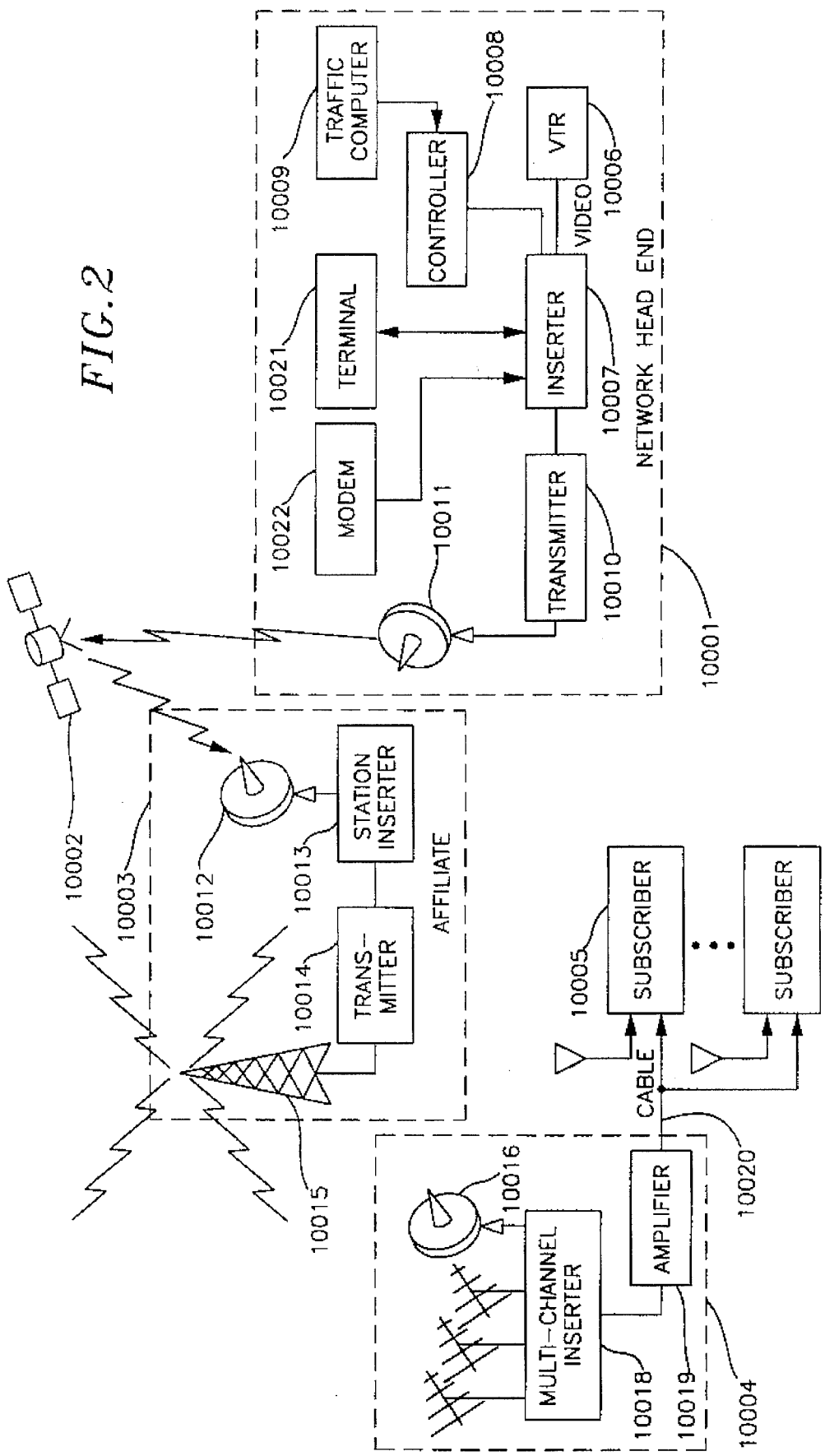
FIG. 2 is a functional block diagram of a television video and data transmission system.

FIG. 2 is a functional block diagram of a data transmission system. As used herein, the terms "broadcast" and "transmit" are used interchangeably for the transmission of signals over cable or fiber optics, to or from satellites, over the air, and the like. A network head end 10001 transmits a composite television signal containing inserted information in a portion thereof, typically the vertical blanking interval (described above in conjunction with FIG. 1), to a satellite 10002 which rebroadcasts the same to a local affiliate 10003. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of individual subscribers 10005. In addition, the individual subscribers 10005 may receive signals directly from the local affiliate 10003 by air, which may include the use of a satellite 10002, or by cable.

More specifically, the network head end has a video tape recorder (VTR) 10006 for providing a program signal to an inserter 10007. A controller 10008 also at the head end controls the scheduling of loading tapes from a cart (a machine with a plurality of video tape cassettes which are moved by a robotic arm from a storage location and inserted into a video tape recorder and vice versa). Furthermore, the controller 10008 controls the lighting of stages during live broadcasts, such as news broadcasts. The controller 10008 is typically a microprocessor based system. A traffic computer 10009 controls the exact timing of playing individual segments of video tapes and inserting commercials therebetween as well as switching between different programs. Some network head ends have both a traffic computer 10009 and a controller 10008. The controller 10008 provides data and commands to the inserter 10007. The traffic computer 10009 provides data and commands to the controller if present. Otherwise, the traffic computer 10009 provides these signals directly to the inserter 10007. The inserter 10007 inserts data into the vertical blanking interval of the composite television signal, as will be described below, and provides the television signal to a transmitter 10010 which in turn provides the television signal on a microwave carrier to a satellite dish 10011 for transmission to the satellite 10002.

The satellite 10002 retransmits the received signal, which is received by a satellite dish 10012 at the affiliate 10003. The dish provides the signal to a station inserter 10013 at the local affiliate 10003. The affiliate may also insert data into the composite television signal as will be described below. The television signal is then provided to a transmitter 10014 and then to a transmitting antenna 10015.

A local cable operator 10004 has a plurality of satellite dishes 10016 and antennas 10017 for receiving signals from a plurality of networks 10001 and affiliates 10003. The received signal from each of the dishes 10016 and antennas 10017 is provided to a respective input of a multi-channel inserter 10018, which can input data into the vertical blanking interval of a received signal. The multi-channel output from the inserter 10018 is amplified in an amplifier 10019 and provided over a cable 10020 to individual subscribers 10005. Alternately the subscribers or users 10005 could receive broadcast information via antennas or satellite receivers.

A VBI slicer and closed caption decoder in a properly equipped television, VCR, or other equipment at each receiver 10005 scans VBI lines 10–21 of both fields 1 and 2. In addition it is possible to use the first few visible lines in each video frame for VBI data, for example, lines 22–24. Lines 1 through 9 are typically used for vertical synchronization and equalization and, thus, are not used to transmit data. Closed captioning and text mode data are generally transmitted on VBI line 21, field 1 of the standard NTSC video signal, at a rate of 2 bytes for each VBI line 21, field 1, as shown by closed caption data 112 in FIG. 3. The text mode fields fill the entire screen with text. The default mode is an open ended mode in which the page is first filled up and then scrolled up. The individual recipient of such data has no control over the data. Extended data services (EDS) data can be transmitted on VBI line 21, field 2, as shown by EDS data 116 in FIG. 3, at a rate of 2 bytes per VBI line 21, field 2.

By way of background, the data in the vertical blanking interval can be described in terms of the wave form, its coding and the data packet. The closed caption data wave form has a clock run-in followed by a frame code, followed by the data. The coding of the data is non-return-to-zero (NRZ) 7 bit odd parity.

Under mandatory FCC requirements effective July 1993, color televisions having a size 13" and greater must provide a closed caption decoder. Caption data decoding is further described in the following specifications, which are hereby incorporated by reference herein: Title 47, Code of Federal Regulations, Part 15 as amended by GEN. Docket No. 91-1; FCC 91–119; "CLOSED CAPTION DECODER REQUIREMENTS FOR THE TELEVISION RECEIVERS"; Title 47, C.F.R., Part 73.682(a)(22), Caption Transmission format; Title 47, C.F.R. Part 73.699, FIG. 6; "TELEVISION SYNCHRONIZING WAVE FORM"; Title 47, C.F.R., Part 73,699, FIG. 17a; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the *Recommended Practice for Line 21 Data Service*, Electronics Industries Association, EIA-608 (drafts Oct. 12, 1992 and Jun. 17, 1993) (hereinafter referred to as "EIA-608" standard"), the subject matter of which is incorporated herein by reference, additional data is provided in line 21, field 2 of the vertical blanking interval. This recommended practice includes two closed captioning fields, two text mode fields and the extended data services. Table 1 shows the classification of data, the class control code, and the type code. The extended data includes, among other information, program name, program length, length into show, channel number, network affiliation, station call letters, UCT (universal coordinated time) time, time zone, and daylight savings time usage. Upstream at the network, the network inserts the program name, the length of the show, the length into the show, the network affiliation, and the UCT time. Downstream at the affiliate, the affiliate inserts the channel number, the time zone, the daylight savings time usage and program names. The network inserts the data that does not differ for different affiliates.

The data is transmitted in packets. Six classes of packets are proposed in the EIA-608 standard, including: (1) a "Current" class for describing a program currently being transmitted; (2) a "Future" class for describing a program to be transmitted later; (3) a "Channel Information" class for describing non-program specific information about the transmitting channel; (4) a "Miscellaneous" class for describing other information; (5) a "Public Service" class for transmitting data or messages of a public service nature such as National Weather Service Warnings and messages; and (6) a "Reserved" class reserved for future definition.

According to the proposed EIA-608 standard, a packet is preceded by a Start/Type character pair, followed by information/informational characters pairs until all the informational characters in the packet have been sent.

Table 1 lists a subset of the control and type codes of various kinds of information to be broadcasted in the VBI according to the EIA-608 standard. For example, to transmit the program identification number (scheduled start time) of a program, a control code of 01, 02 hex, a type code of 01 hex and a packet of four characters (one character specifying the minute, one character specifying the hour, one character specifying the date and one character specifying the month) are sent. Similarly, to transmit the program name, a control code of 01, 02 hex, a type code of 03 hex, and a packet of between 2 to 32 characters are sent. As another example, the VBI may also be used to transmit a time-of-day value, by sending a control code of 07, 08 hex, a type code of 01 hex, and a packet of two characters., The data can be encrypted as described in U.S. patent application Ser. No. 08/183;602, filed Jan. 18, 1994, which is incorporated herein by this reference as though set forth in full. The inserter 10007 stores data from the video stream and handles the insertion of such data into the video stream.

TABLE 1

| Class | Class Control Code | Type |
|---|---|---|
| Current Class | | |
| Program Identification (scheduled start time) | 01 hex, 02 hex | 01 hex |
| Length/Time-in-show | 01 hex, 02 hex | 02 hex |
| Program Name | 01 hex, 02 hex | 03 hex |
| Program Type | 01 hex, 02 hex | 04 hex |
| Program Rating | 01 hex, 02 hex | 05 hex |
| Audio Services | 01 hex, 02 hex | 06 hex |
| Caption Services | 01 hex, 02 hex | 07 hex |
| Current Class | | |
| Aspect Ratio Information | 01 hex 02 hex | 09 hex |
| Composite Packet - 1 | 01 hex, 02 hex | 0C hex |
| Composite Packet - 2 | 01 hex, 02 hex | 0D hex |
| Program Description row 1 to 8 | 01 hex, 02 hex | 10 hex–17 hex |
| Channel Information Class | | |
| Network Name (affiliation) | 05 hex, 06 hex | 01 hex |
| Call Letters (Station ID) and Native Channel | 05 hex, 06 hex | 02 hex |
| Tape Delay | 05 hex, 06 hex | 03 hex |
| Miscellaneous | | |
| Time of Day | 07 hex, 08 hex | 01 hex |
| Impulse Capture ID | 07 hex, 08 hex | 02 hex |
| Supplemental Data Location | 07 hex, 08 hex | 03 hex |
| Local Time Zone & DST Use | 07 hex, 08 hex | 04 hex |

TABLE 1-continued

| Class | Class Control Code | Type |
|---|---|---|
| Public Service Class | | |
| National Weather Service Code | 09 hex, 0A hex | 01 hex |
| National Weather Service Message | 09 hex, 0A hex | 02 hex |

The data inserted into the television signal by the inserter includes closed captioning data and EDS data. The station inserted data can include data such as a channel specific program guide (CSPG), program related information (PRI), supplemental text, and a VM packet which is a data packet used for triggering and control and which are described in U.S. patent application Ser. No. 08/176,852, filed Dec. 30, 1993 which is incorporated herein by this reference as though set forth in full. The traffic computer 10009 provides bare bone time and title information automatically to the inserter for creating a channel specific program guide. The channel specific program guide and other data can be inserted into either or both fields in any VBI line between 10 and 20. For example the data can be inserted into line 20 of field 2, as shown by data 114 in FIG. 3. The data may be inserted into the VBI at the closed caption rate (1X format) or at two times the closed caption rate (2X format), which is further explained below.

Data, such as program identification, program related information, or the channel specific program guide (i.e., the program descriptions of the programs yet to be broadcast) may be manually entered from a local terminal 10021. The local terminal 10021 may be used to pre-build, recall, or edit messages. The terminal 10021 typically includes a computer. In addition, a modem 10022 may be used to provide data to the inserter 10007. Such data (the program identification, program related information or channel specific program guide) may be provided manually or automatically from remote sites, such as a television program guide publisher or the network head end. The output of the inserter 10007 is a composite television signal with the data inserted. This system processes both teletext data (which is not related to the program) and auxiliary information (which is related to the program).

The timing of video signals in NTSC format is well known in the art. As described above, the vertical blanking interval is the time between the flyback from the bottom of the screen to the top of the screen. Although no video signal is displayed, the horizontal synchronization pulses are still provided during the VBI. The standard data transmission rate is defined in the EIA-608 standard.

Figure 4:
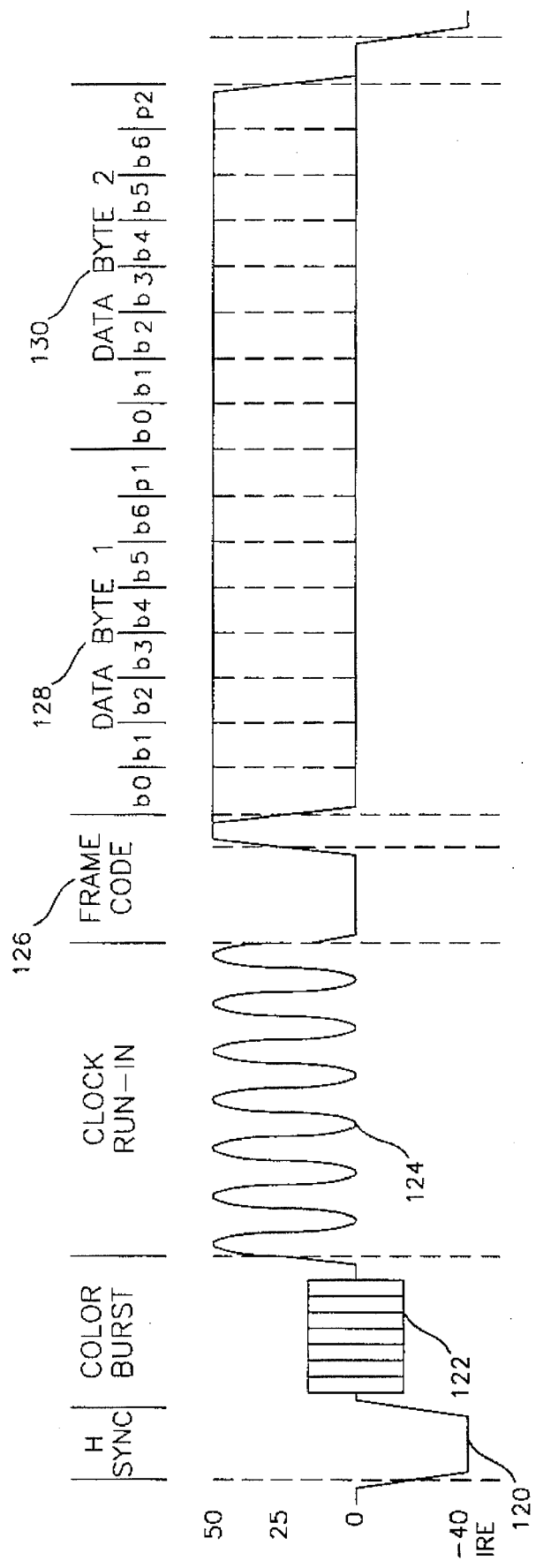
FIG. 4 is a timing diagram of the standard data format (1X) for transmitting data in the VBI.

As shown in FIG. 4, the horizontal synchronization pulse 120 is followed by color burst signals 122. For closed caption and EDS data, a clock run-in cycle 124 follows the color burst which in turn is followed by a frame code 126. The clock run-in is "10101010101." The frame code is "01000011." Two data bytes 128 and 130 are transmitted in each VBI line. Each byte is 8 bits including a parity bit. This format is referred to as the standard data rate format (or 1X format). Each byte in the VBI line is arranged with the least significant byte first. The last bit is used as parity for error checking. Each byte of the transmitted data is parity checked upon receipt. The 1X format is the format used to transmit closed captions in VBI line 21 field 1, as shown by closed caption data 112 in FIG. 3. It is also the format used to transmit EDS data in VBI line 21 field 2, as shown by EDS data 116 in FIG. 3.

Figure 5:
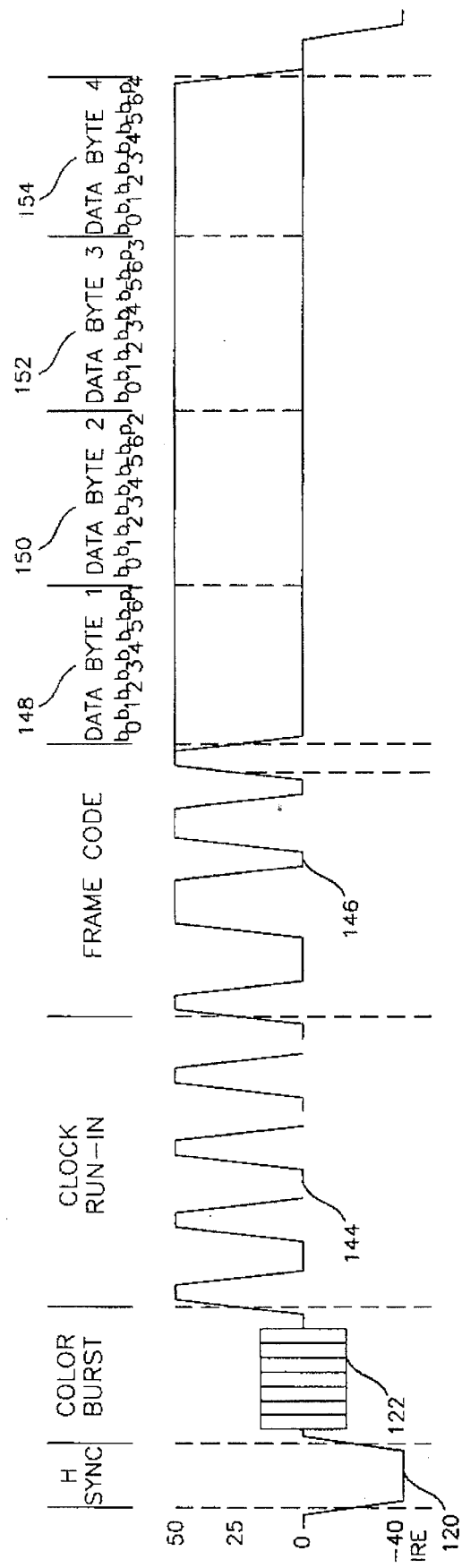
FIG. 5 is a timing diagram of the accelerated data format (2X) for transmitting data in the VBI.

An accelerated data format (2X format) as shown in FIG. 5 uses a bit rate twice that of the 1X format to thereby provide 4 bytes per VBI line. The clock run-in 144 is the bit sequence "10101010.' The frame code 146 is "10011101101." Four data bytes 148, 150, 152 and 154 are transmitted each VBI line. The 2X format can be used to transmit DN, CSPG, PRI, and VM packets, as shown by data 114 in FIG. 3.

Figure 6A:
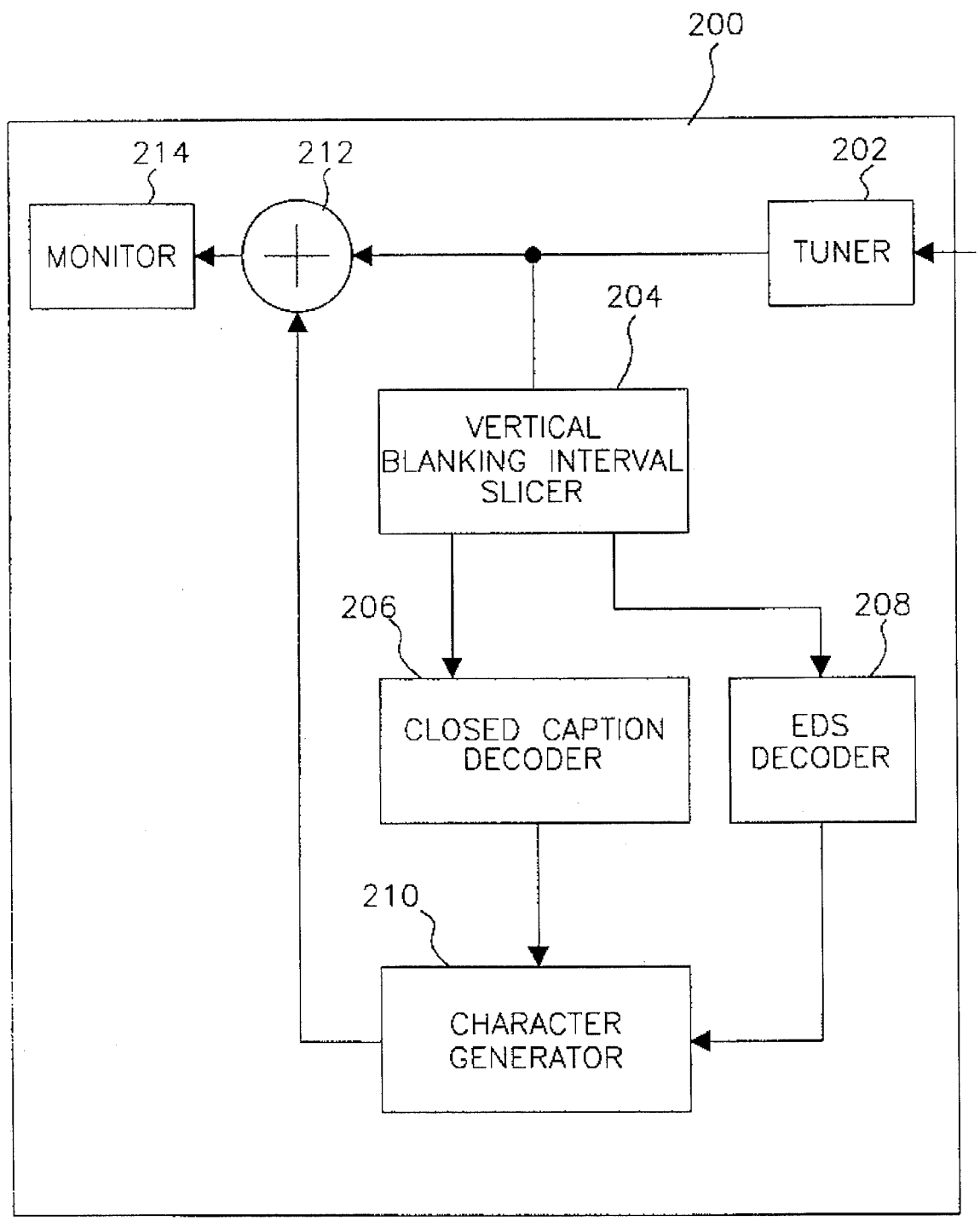
FIG. 6a is a functional block diagram of a television including a vertical blanking interval slicer and decoder.

FIG. 6a is a functional block diagram of a television 200 including a vertical blanking interval slicer 204. The vertical blanking interval slicer 204 has an input from tuner 202. The vertical blanking slicer 204 may include a closed caption decoder or a closed caption decoder 206 may be coupled to the VBI slicer 204. The output of the closed caption decoder is sent to character generator 210 that generates characters that can be added to the television signal from the tuner 202 in adder 212 and then displayed on monitor 214. The vertical blanking interval slicer 204 can also be coupled to an extended data services (EDS) decoder 208.

Figure 6B:
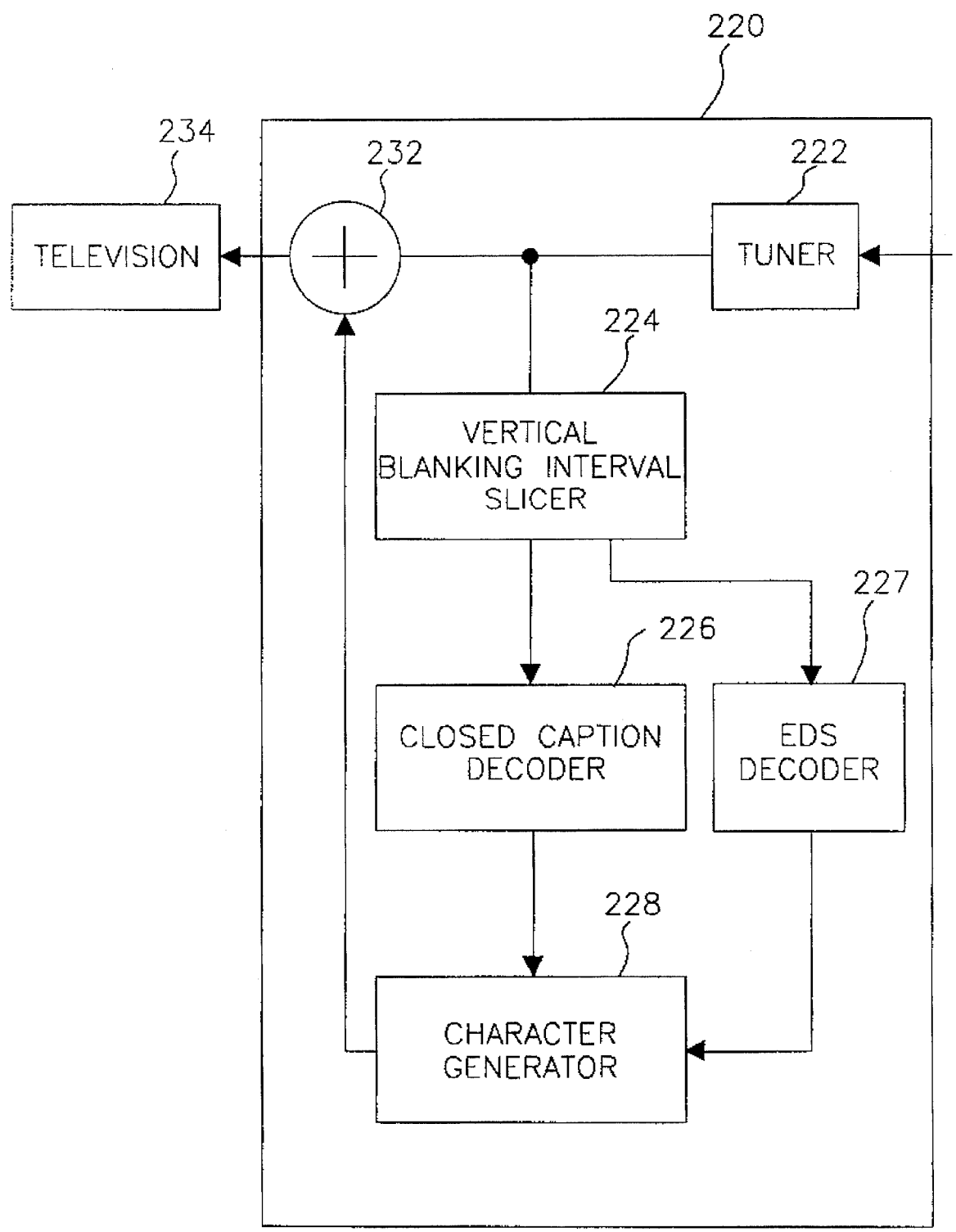
FIG. 6b is a functional block diagram of a video cassette recorder or appliance including a vertical blanking interval slicer and decoder.

Instead of locating the VBI decoder in a television, the VBI decoder can be included in a video cassette recorder or other appliance. FIG. 6b shows an appliance 220 that includes a tuner 222 that feeds a VBI slicer 224, a closed caption decoder 226, and an EDS decoder 227. A character generator 228 is included in the appliance and the output of the character generator is added in adder 232 to the signal that is sent to a television 234. The subject of this invention is to ensure that the VBI slicer and closed caption decoder, whether located in a television or an appliance, will lock onto VBI line 21 in field 1, so that closed caption data is not lost, even when extended data services (EDS) data is being sent in field 2, VBI line 21. Also this invention includes methods for ensuring that the VBI slicer and the closed caption decoder lock onto the closed caption data in field 1, VBI 21, even if there is data in adjacent VBI lines in field 1 or field 2.

FIGS. 7a and 7b illustrate situations in which closed caption data is lost. FIG. 7a is a timing diagram illustrating locking onto extended data services in field 2, line 21, rather than closed caption data in field 1, line 21, when a channel is switched. As shown in timing line 250, closed caption data is being inserted and transmitted in field 1, line 21, on channel A and the VBI decoder is locked onto line 21 in field 1. Then at time 254, the user switches channels from A to B. There is a momentary interruption of closed caption data reception between time 254 and time 256. Then at time 256, the closed caption data reception resumes on channel B. Ideally, at time 256, the VBI decoder would again lock onto line 21 in field 1, to receive the closed caption data. Timing line 252 illustrates that extended data services (EDS) data is being inserted and transmitted and received, and also has a momentary interruption when the channel is switched. The EDS data is being received in field 2, VBI line 21. When the momentary interruption of closed caption data occurs at time 254, FIG. 7a illustrates that at time 258 the VBI decoder may lock onto field 2, line 21 rather than field 1, line 21. Once the VBI decoder is locked onto field 2, line 21, the VBI decoder remains locked on field 2, line 21 and the closed caption data on channel B is lost. The result is that EDS data may be interpreted as faulty closed caption data and displayed on the television monitor. This is quite disturbing to hearing impaired viewers that depend on closed captions in order to "listen" to a program.

FIG. 7b is a timing diagram illustrating a closed caption decoder locking onto extended data services (EDS) data in field 2, line 21 rather than closed caption data in field 1, line 21, when a commercial break occurs. Timing line 260 shows that at the beginning of the timeline, the closed caption decoder is locked onto the field 1, line 21 for receiving the closed caption data. Then at time 264 a commercial break occurs, momentarily interrupting the closed caption data. Then at time 268, the closed caption data insertion and transmission resumes in field 1, line 21. Timing line 262 shows that extended data services (EDS) data is inserted, transmitted and received before, during and after the commercial break. During the commercial break, the closed caption decoder breaks lock with the closed caption data and locks onto the EDS data at time 266. Then when closed caption data is resumed at time 268, the closed caption decoder remains locked onto the EDS data. This may result in junk being displayed rather than closed caption data. Other similar behaviors occur for some closed caption decoders when closed caption data and extended data services are both used.

Particular problems were observed with Zenith TV model CC2566S. Table 2 shows the results of 15 experiments that were conducted on the Zenith TV Model CC2566S. Experiment 1, is a situation is which closed caption data and EDS data are inserted and transmitted continuously. The closed caption data is inserted into field 1, line 21 and the EDS data is inserted into field 2, line 21. When in experiment 1, a channel was switched to the adjacent channel and then back, out of 229 trials there were 98 malfunctions which resulted in the loss of closed caption data. As illustrated in footnote a, the malfunction resulted in unrelated characters being displayed on one full line. This is approximately a 43% malfunction rate. When the channel was not switched, but the closed caption transmission was interrupted for about 6 seconds then out of 10 trials, there were 10 malfunctions. In this case, as shown in footnote b, the malfunction resulted in unrelated characters being displayed at the end of the last line of the closed caption data. In this case, there was a 100% malfunction rate.

In experiment 2, EDS data is inserted in a set of frames that are 40 to 50 frames long with N2=52 frames between each set of EDS data. Also in experiment 2, the EDS data insertion is stopped N1=52 frames after closed caption data is detected as not being received.

Other experiments have indicated that if there is no closed captioned system data in the last three seconds before a commercial break then setting N1=52, which is equivalent to approximately 2 seconds, is sufficient. However if there is closed caption data just before a commercial break, then N1 must be set higher to avoid malfunctions. The value of N1 should be set to approximately 150, which stops EDS data insertion for five seconds after closed caption data is detected as not being received.

Figure 9:
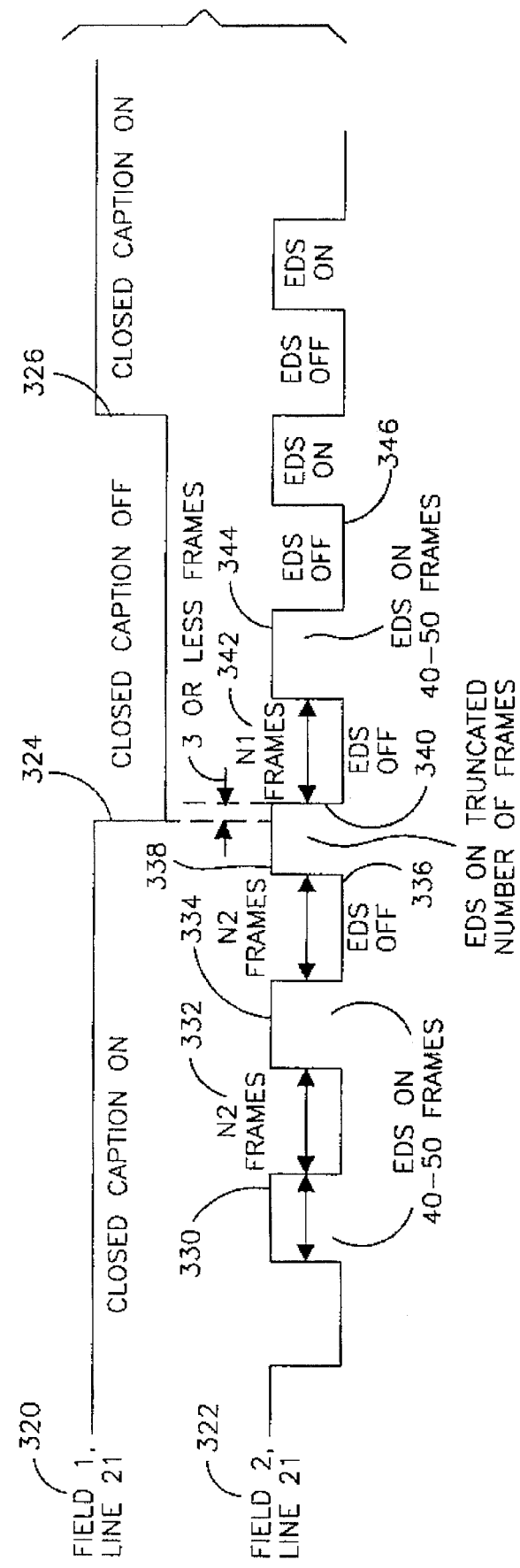
FIG. 9 is a timing diagram illustrating gaps in extended data services data to avoid loss of closed caption data.

This is illustrated in FIG. 9. Timing line 320 illustrates closed caption data being inserted in field 1, line 21 at the beginning and then being turned off at time 324 and then resuming at time 326. Timing line 322 illustrates EDS data being inserted in field 2, line 21 for 40 to 50 frames and then being turned off for N2 frames and then turned on for another 40 to 50 frames and then turned off again. For example, EDS insertion and transmission is on during time periods 330, 334, and 344. EDS data insertion and transmission is off during time periods 332, 336, and 346. When it is sensed that closed caption data insertion and transmission has ceased at time 324, then within 3 frames or less, the insertion and transmission of EDS data, illustrated as time period 338, is stopped at time 340. This results in a truncated number of frames for insertion and transmission of EDS data during time period 338. A gap of N1 frames illustrated as time period 342 is allowed to pass before EDS data is again inserted and transmitted in time period 344. The range for N1 is shown as 50 to 160 frames; however, as indicated a value of about 150 is best.

As shown in Table 2, the results of experiment 2 indicate zero malfunctions, when channel switches were performed 210 times. Also when closed caption data transmission was interrupted 210 times there were zero malfunctions. Thus, in experiment 2, there is a zero malfunction rate compared to 43% to 100% malfunction rate for experiment 1.

Experiments 3 through 11 show the effect of data transmitted in VBI lines adjacent to line 21 and experiments 3–6 show the effect of N2 being shorter than 52 frames. As indicated above, line 21 of field 1, contains closed caption data. In experiments 3 through 11 EDS data at 1X format and CSPG data at 2X format are transmitted in the lines adjacent to line 21 of either field 1 or field 2. The results of these experiments show that there are malfunctions in the receipt of closed caption data under some conditions.

Experiments 3–6 show that decreasing N2 from 52 to 30 to 37 increases the malfunction rate. The lesson is that it is best to have a higher value for N2.

Experiments 7–10 show that whenever there is continuous 1X data in lines 19, 20, 22 or 23 (VBI line 21, plus or minus two lines), the closed caption decoder malfunctions and locks onto the wrong VBI line or displays an incorrect closed caption. The results are similar to the result of experiment 1.

Experiments 11 through 15 were designed to test the effect of inserting data in 2X format in VBI lines 19, 20, 22, or 23 adjacent to line 21. Out of 2480 trials, 7 showed some blank character or unrelated characters at the end of the last line of closed caption data during a closed caption data transmission interruption. However, everything returned to normal after 1 to 2 seconds. The lesson of experiments 7 through 15 is that, if data is transmitted in VBI lines adjacent to line 21, then the data should be transmitted in the 2X format, which is described above.

TABLE 2

| | Performance of Zenith TV model CC2566S | | | | | | | | | |
|---|---|---|---|---|---|---|---|---|---|---|
| | | | | | | | | | Results (No. of Malfunctions) | |
| Expt. | Data in VBI lines | | | | | | | Switch | Interrupt Closed | No. of Trials for each |
| No. | 14 | 18 | 19 | 20 | 21 | 22 | 23 | 24 | Channel[1] | Caption[2] | test |
| 1 | | | | | Continuous | | | | 98[a] | — | 229 |

TABLE 2-continued

Performance of Zenith TV model CC2566S

| Expt. No. | Data in VB1 lines | | | | | | | | Switch Channel[1] | Interrupt Closed Caption[2] | No. of Trials for each test |
|---|---|---|---|---|---|---|---|---|---|---|---|
| | 14 | 18 | 19 | 20 | 21 | 22 | 23 | 24 | | | |
| | | | | | Closed caption & EDS | | | | | 10[b] | 10 |
| 2 | | | | | FIG. 9 N1 = 52, N2 = 52 | | | | 0 | 0 | 210 |
| 3 | 1x Data | | | 2x Data | FIG. 9 N1 = 52, N2 = 37 | 2x Data | | 1x Data | 2[c] | 1[c] | 210 |
| 4 | | 1x Data | | 2x Data | FIG. 9 N1 = 52, N2 = 35 | 2x Data | | 1x Data | 6[c] | 0 | 210 |
| 5 | | 1x Data | | 2x Data | FIG. 9 N1 = 52, N2 = 33 | 2x Data | | 1x Data | 11[c] | 1[c] | 210 |
| 6 | | 1x Data | | 2x Data | FIG. 9 N1 = 52, N2 = 30 | 2x Data | | 1x Data | 5[c] | 0 | 210 |
| 7 | | | | | FIG. 9 N1 = 52, N2 = 52 | 1x Data | | | 6[a] or[b] | 10[b] | 10 |
| 8 | | | | 1x Data | FIG. 9 N1 = 52, N2 = 52 | | | | 5[a] or[b] | 10[b] | 10 |
| 9 | | | 1x Data | | FIG. 9 N1 = 52, N2 = 52 | | | | 8[a] or[b] | 10[b] | 10 |
| 10 | | | | | FIG. 9 N1 = 52, N2 = 52 | | 1x Data | | 7[a] or[b] | 10[b] | 10 |
| 11 | 1x Data | 1x Data | | 2x Data | FIG. 9 N1 = 52, N2 = 52 | 2x Data | | | 0 | 0 | 10 |
| 12 | | | | | FIG. 9 N1 = 52, N2 = 52 | 2x Data | | | 0 | 4[c] | 210 |
| 13 | | | | 2x Data | FIG. 9 N1 = 52, N2 = 52 | 2x Data | | | 2[c] | 0 | 510 |
| 14 | | | 2x Data | 2x Data | FIG. 9 N1 = 52, N2 = 52 | 2x Data | 2x Data | | 0 | 0 | 10 |
| 15 | 2x Data | | 2x Data | 2x Data | FIG. 9 N1 = 52, N2 = 52 | 2x Data | | | 0 | 1[c] | 510 |

TABLE 3

Performance of Zenith TV model CC2566S at longer closed-caption off intervals. Waveform same as FIG. 9 with N1 = 52 and N2 = 52

| Expt. No. | Duration of Observation After the Interrupt of Closed Caption | Number of Malfunctions | Total Number of Times Tried |
|---|---|---|---|
| 16 | 2 minutes | 1[c] | 20 |
| 17 | 5 minutes | 0 | 20 |
| 18 | 30 minutes | 0 | 3 |

Notes:
[1]Switch to adjacent channel. Stay for about 6 seconds and switch back.
[2]Closed caption is interrupted for about 6 seconds and then resumed to simulate interruption due to a commercial
[a]Un-related characters displayed on one full line. This line scrolls up to the top of the screen and stays there until a channel change or power is turned off.
[b]Un-related characters displayed at the end of the last line of closed caption data. It can be reset by changing channels or turning power off.
[c]Un-related characters displayed at the end of the last line of the closed caption data for 1–2 seconds and then returns to normal closed captions.

For experiments 1 through 15 of Table 2, the closed caption data was interrupted for approximately 6 seconds and then any malfunctions were observed. In Table 3, the results of experiments 16 through 18 are shown in which the closed caption off interval is varied between 2 to 30 minutes.

The wave form being transmitted for the experiments of Table 3, is the same wave form as for experiment 2 in Table 2. There was only one malfunction in the 43 trials shown in Table 3. The one malfunction showed unrelated characters displayed at the end of the last line of the closed caption data for 1 to 2 seconds and then returned to normal.

The behavior of a closed caption decoder and the Zenith TV model CC2566S is partially explained by the flow diagram of FIG. 8. FIG. 8 is a flow diagram of a possible method used by a closed caption decoder when searching for a closed caption data in a vertical blanking interval line. In step 280, the closed caption decoder searches for closed caption data in field 1, line 21. Closed caption data is always transmitted in 1X format. In step 282, it is determined whether data is found in field 1, line 21, and if so, then in step 286 the closed caption decoder locks onto the data and field 1, line 21. Then in step 284, if certain control codes are received in the last N seconds then the data is displayed on a monitor. If data is not found in step 282, then in step 290 field 2, line 21 is searched for data in 1X format. If it is determined in step 292 that data has been found in 1X format in field 2, line 21, then in step 296 the closed caption decoder locks onto to field 2, line 21. This results in lost closed caption data, because when closed caption data is again transmitted in field 1, line 21, the closed caption decoder is already locked onto field 2, line 21 and therefore, the closed caption data in field 1, line 21 is lost. If data is not found in step 292, then in step 300 the closed caption decoder searches adjacent VBI lines, such as VBI lines 19, 20, 22, and 23 for data in 1X format. If data in 1X format is found in one of these VBI lines then the closed caption decoder locks onto that line in step 306. Again, in step 284, if certain control codes are received in the last N seconds then the data is displayed on a monitor. If data is not found in step 302 the closed caption decoder cycles back to step 280 and the cycle is repeated until the closed caption decoder finds data in one of the VBI lines.

The closed caption decoder in Zenith TV model CC2566S does not necessarily operate in the manner described, however, this behavior would explain some of the malfunctions discovered in the experiments of Table 2.

Figure 10:
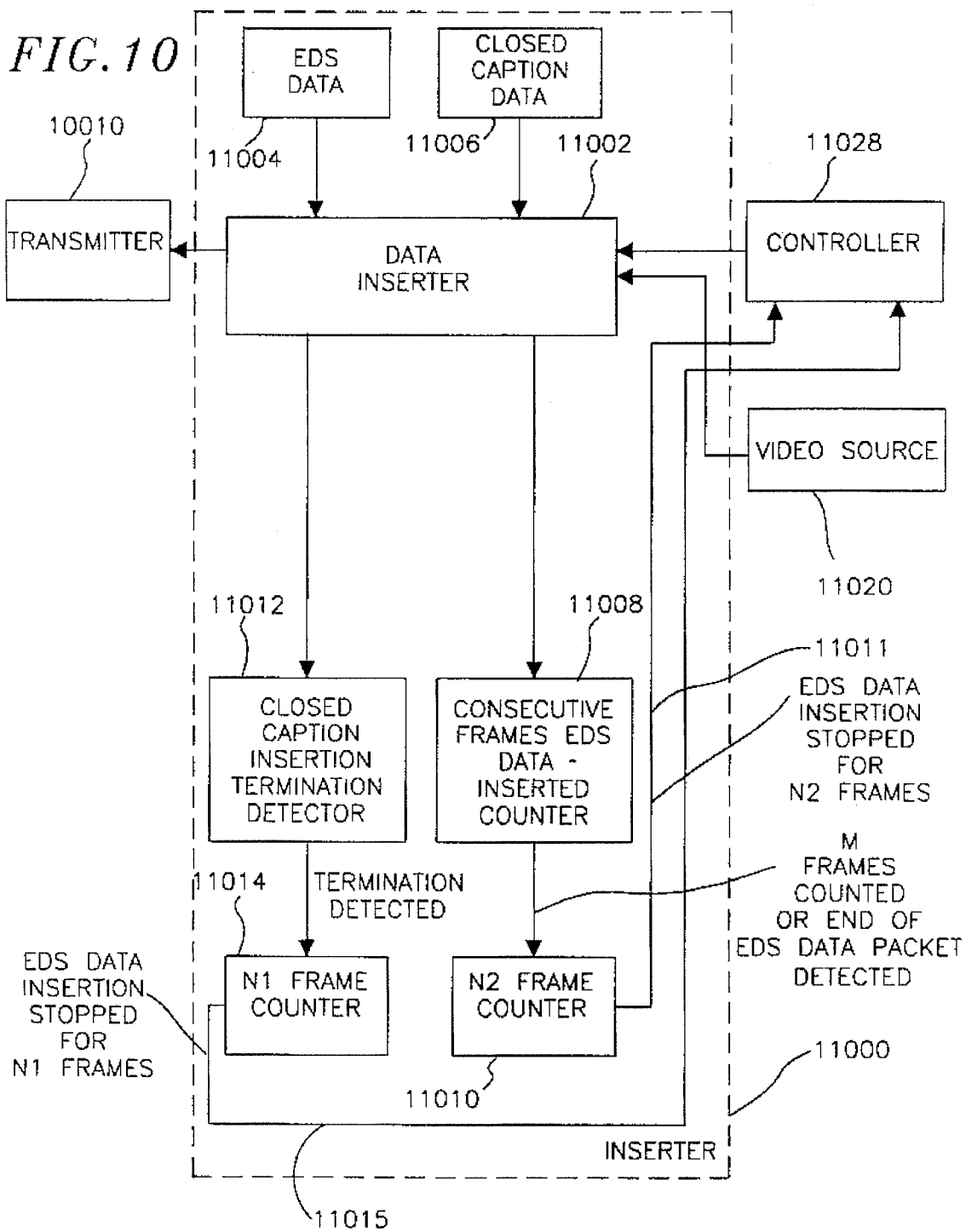
FIG. 10 is a functional block diagram of an apparatus for inserting EDS data into a vertical blanking interval line to avoid loss of closed caption data.

FIG. 10 is a functional block diagram of an apparatus 11000 for inserting EDS data into a vertical blanking interval line and for inserting closed caption data in another vertical blanking interval line. This insertion apparatus avoids loss of closed caption data at a receiver. FIG. 2 shows a functional block diagram of a television video and data transmission system. It is possible to insert closed caption data and EDS data at various places along the transmission system. For example, data can be inserted at inserter 10007 at the network head end, or at station inserter 10013 at the affiliate, or at multi channel inserter 10018 at the local television station. The insertion apparatus 11000 will be described as replacing inserter 10007 in the network head end shown in FIG. 2. This same insertion apparatus can be used in other locations along the transmission system.

As shown in FIG. 10 video from a video source 11020, which corresponds to the video from VTR 10006 in FIG. 2, is applied to a data inserter 11002. The output of data inserter 11002 is sent to a transmitter 10010, which corresponds to the transmitter 10010 in the network head end 10001 in FIG. 2. A controller 11028, which corresponds to the controller 10008 in the network head end in FIG. 2, also has an interface to data inserter 11002. The insertion apparatus 11000 includes sources for closed caption data 11006 and for EDS data 11004, coupled to the data inserter 11002. The data inserter inserts the closed caption data into VBI line 21 of field 1, and inserts the EDS data into line 21 field 2 of the television signal under the control of controller 11028 and under the control of the following counters and detectors.

A counter 11008 is coupled to the data inserter 11002 for counting the consecutive frames of EDS data. A detector 11012 is coupled to the data inserter 11002 to detect each termination of closed caption data. A counter 11010 is coupled to counter 11008 to count N2 frames in response to a selected count from counter 11008 or the end of an EDS packet detected by counter 11008. A counter 11014 is coupled to detector 11012 to count N1 frames in response to the end of closed caption data. The output of each counter 11010 and 11014 is coupled to the controller 11028.

When EDS data is being inserted into the frames by data inserter 11002, counter 11008 counts the number of consecutive frames into which EDS data is inserted. When EDS data has been inserted into M consecutive frames or when the end of the EDS data packet is detected before M consecutive frames, then N2 frame counter 11010 is started. Once the N2 frame counter 11010 has started and until the N2 frame counter counts N2 frames, a control signal 11011 is sent to the controller 11028 to stop EDS data insertion for N2 frames. The result is a gap of N2 frames between sets of M or less consecutive frames containing EDS data.

In parallel, the closed caption insertion termination detector 11012 determines whether there has been a termination of closed caption data insertion into the video being sent to transmitter 10010. If a termination is detected, then N1 frame counter 11014 sends a signal 11015 to the controller 11028 in order to terminate EDS data insertion for N1 frames. This ensures that no EDS data is sent for N1 frames after a termination of sending closed caption data. The termination of insertion of closed caption data into the VBI lines is detected in three or less frames so that EDS data insertion is stopped within three frames of the termination of closed caption data insertion into the VBI lines.

By replacing the inserter 10007, shown in FIG. 2, with the insertion apparatus 11000 described above, the loss of closed caption data at a receiver is avoided.

Figure 11:
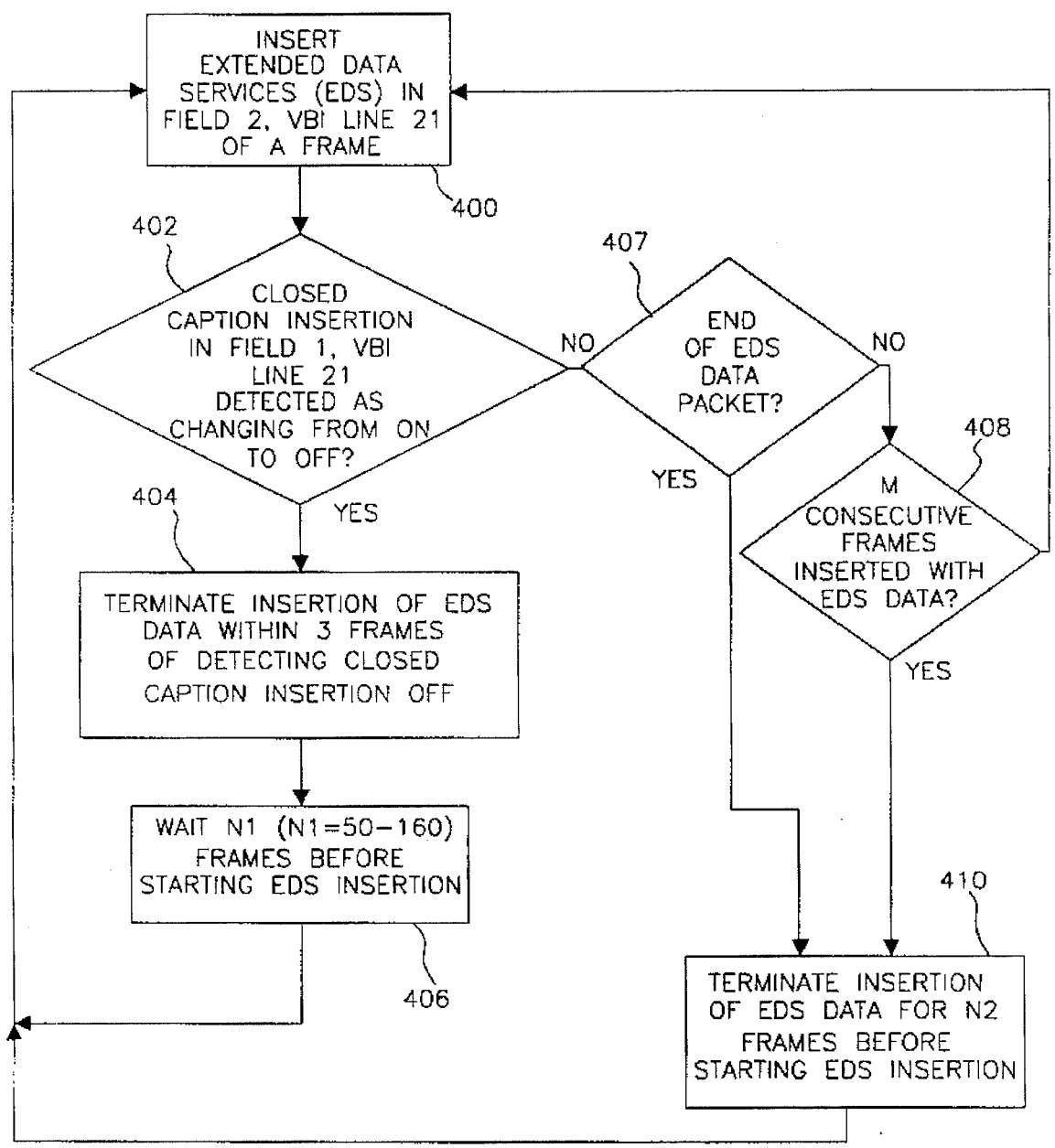
FIG. 11 is a flow diagram of a method for inserting gaps into extended data services (EDS) data inserted into a vertical blanking interval line to avoid loss of closed caption data.

FIG. 11 is a flow diagram of the operation of the insertion apparatus 11000 whereby gaps are created in the extended data services (EDS) data, being inserted into a vertical blanking interval line. The resulting method shown in the flow chart of FIG. 11 avoids loss and corruption of closed caption data. In step 400 extended data services (EDS) data is inserted into field 2, VBI line 21 of a frame by data inserter 11002. In step 402 it is determined by detector 11012 whether closed caption data insertion into field 1 VBI line 21 has been interrupted. If the closed caption data insertion into field 1 line 21 has not been interrupted, then in step 407 it is determined by counter 11003 whether the EDS data packet has ended. If the EDS data packet has ended then in step 410 counter 11010 counts N2 frames and controller 11028 causes the apparatus to wait N2 frames before starting the insertion of EDS data into frames again in step 400. Step 407 recognizes the fact that EDS data packets can vary in size. Some can be quite long, but most EDS data packets are less than 30–40 frames. Two or three EDS data packets may be bundled together to be sent and then a break will occur in EDS data packet insertion. This method ensures that the break will be N2 frames long.

If the EDS data packet has not ended, then in step 408, it is determined by counter 11008 whether M consecutive frames have been inserted with EDS data. If M consecutive frames have not been inserted with EDS data, and the end of the data packet hasn't been reached, then step 400 is repeated. If M consecutive frames have been inserted with EDS data, as determined by counter 11008 then the insertion of EDS data is terminated in step 410 for N2 frames before EDS data is inserted into frames again in step 400. On resumption of sending the EDS data, a continuation code (see EIA-608 standard) is sent at the start and then the EDS data can continue where it left off.

If it is determined by detector 11012 in step 402 that closed caption data insertion into field 1 line 21 has been interrupted, then in step 404 the insertion of EDS data into frames is terminated within 3 frames of detecting the interruption of closed caption data insertion in response to an output frame counter 11014 which starts counting N1 frames. Then in step 406 the method waits N1 frames before starting the insertion of EDS data into frames again in step 400.

Using the method described in FIG. 11 results in the time line for EDS insertion shown in FIG. 9. Since this is the same EDS insertion time line that is used in experiment 2 of Table 2, no malfunctions should occur in the receipt of closed caption data when channel switching or commercial breaks interrupt closed caption data reception.

It is important that the parameters N1 and N2 be properly set. It has been found that it is best to set the N2 in the range of about 45–55 frames and the N1 in the range of about 140–160 frames.

Experiments 7 through 10 show the effect of continuous 1X format data in lines 19, 20, 22 or 23 (VBI line 21+or −2). These results indicate that there are significant malfunctions in the receipt of closed caption data if 1X data is in VBI lines adjacent to VBI line 21. Experiments 11 through 15 show the effect of inserting 2X format data into VBI lines adjacent to line 21. As described above, out of more than 2,000 trials only 7 of the trials had malfunctions with unrelated characters at the end of the last line of the closed caption during an interruption of the closed caption data.

Figure 12:
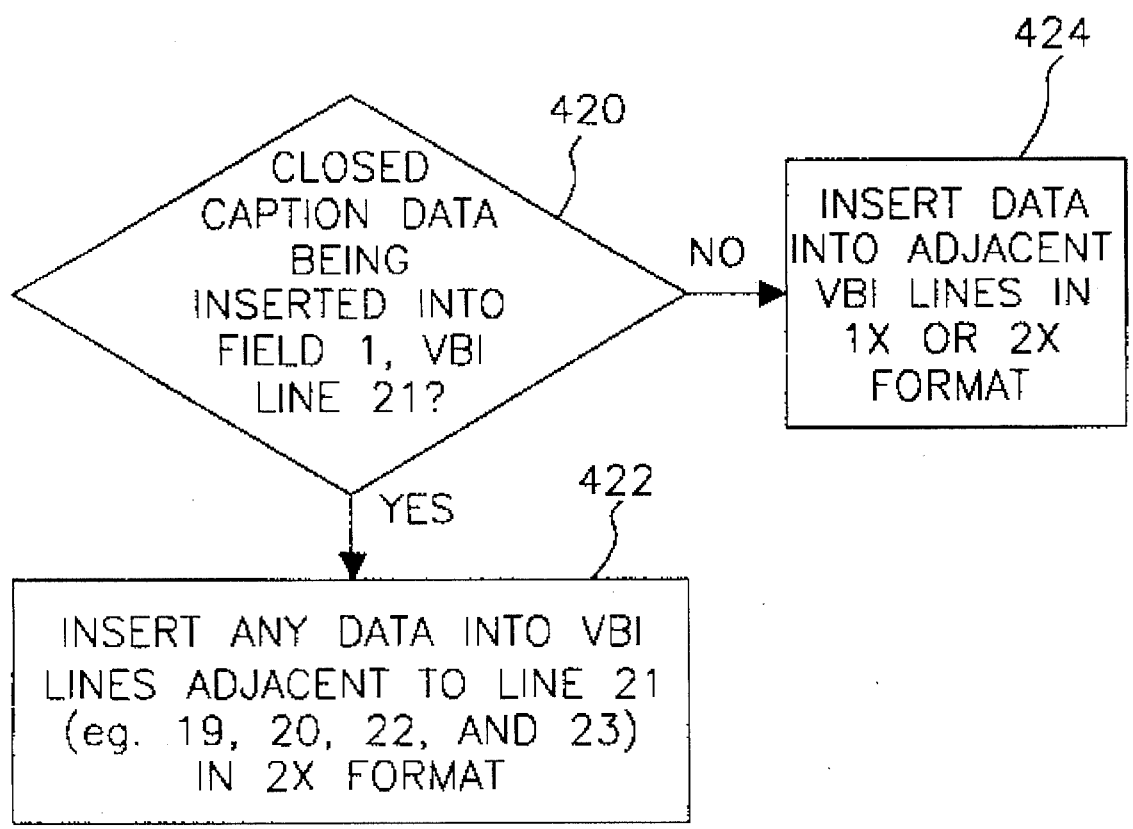
FIG. 12 is a flow diagram of a method of inserting data into vertical blanking interval lines adjacent to the vertical blanking interval line of the closed caption data so that the closed caption data is not lost.

FIG. 12 is a flow diagram of the operation of the insertion apparatus 11000 where the data inserted into vertical blanking interval lines 19, 20, 22 or 23 adjacent to closed caption data in VBI line 21 is controlled so that closed caption data is not lost. In step 420 detector 11012 determines whether closed caption data is being inserted into field 1, VBI line 21. If the closed caption data is not being inserted into field 1, VBI line 21 then controller 11028 causes, in step 424, the data being inserted into adjacent VBI lines to be in 1X or 2X format. If closed caption data is being inserted into field 1, VBI line 21, then the controller 11028 causes, in step 422, any data that is inserted into VBI lines adjacent to line 21 to be inserted in 2X format.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention. (Figure descriptions and spec is the same as 26863, except as noted in faxed sheets)

What is claimed is:

1. A method for inserting data into a vertical blanking interval line of video frames, the method comprising the steps of:

inserting extended data services (EDS) data into a first vertical blanking interval line in a first field for a plurality of consecutive video frames;

counting a number of consecutive video frames having EDS data inserted into the first vertical blanking interval line;

terminating the insertion of EDS data for a first number of video frames before again inserting EDS data into the first vertical blanking interval line when the counted number of consecutive video frames into which EDS data is inserted into the first vertical blanking interval line equals a second number;

inserting second data into a second vertical blanking interval line in a second field for a plurality of consecutive video frames, the second vertical blanking line being a same line number as a line number for the first vertical blanking line number;

detecting when the insertion of second data into the second vertical blanking interval line terminates;

terminating for a second number of video frames the insertion of EDS data into the first vertical blanking interval line upon detecting the termination of insertion of the second data into the second vertical blanking interval line; and repeating the steps.

2. The method of claim 1 further comprising the steps of:

testing whether second data is being inserted into the second vertical blanking interval line; and inserting third data into a vertical blanking interval line adjacent to the second vertical blanking interval line in 2X format rather than 1X format, if second data is being inserted into the second vertical blanking interval line.

3. The method of claim 1 wherein the second data is closed caption data.

4. The method of claim 3 wherein:

the step of detecting when the insertion of second data into a second vertical blanking interval line terminates comprises the steps of detecting when the insertion of closed caption data terminates; and the step of terminating comprises the step of terminating within 3 frames of detecting when the insertion of closed caption data terminates.

5. The method of claim 3 wherein:

the step of inserting EDS data into the first vertical blanking interval line of consecutive video frames comprises the step of inserting data into field 2 line 21 of the vertical blanking interval; and the step of inserting second data into the second vertical blanking interval line of consecutive video frames comprises the step of inserting data into field 1 line 21 of the vertical blanking interval.

6. The method of claim 3 wherein:

the first number is in the range of 45 to 55; and the second number is in the range of 140–160.

7. An apparatus for inserting data into a vertical blanking interval line of video frames, the apparatus comprising:

means for inserting extended data services (EDS) data into a first vertical blanking interval line in a first field for a plurality of consecutive video frames;

means for counting a number of consecutive video frames having EDS data inserted into the first vertical blanking interval line;

means for terminating the insertion of EDS data for a first number of video frames before again inserting EDS data into the first vertical blanking interval line when the counted number of consecutive video frames into which EDS data is inserted into the first vertical blanking interval line equals a second number;

means for inserting second data into a second vertical blanking interval line in a second field for a plurality of consecutive video frames, the second vertical blanking line being a same line number as a line number for the first vertical blanking line number;

means for detecting when the insertion of second data into the second vertical blanking interval line terminates; and means for terminating for a second number of video frames the insertion of EDS data into the first vertical blanking interval line upon detecting the termination of insertion of the second data into the second vertical blanking interval line.

8. The apparatus of claim 7 further comprising:

means for testing whether second data is being inserted into the second vertical blanking interval line; and means for inserting third data into a vertical blanking interval line adjacent to the second vertical blanking interval line in 2X format rather than 1X format, if second data is being inserted into the second vertical blanking interval line.

9. The apparatus of claim 7 wherein the second data is closed caption data.

10. The apparatus of claim 9 wherein:

the means for detecting when the insertion of second data into a second vertical blanking interval line terminates comprises means for detecting when the insertion of closed caption data terminates; and the means for terminating comprises means for terminating within 3 frames of detecting when the insertion of closed caption data terminates.

11. The apparatus of claim 9 wherein:

the means for inserting EDS data into the first vertical blanking interval line of consecutive video frames comprises means for inserting data into field 2 line 21 of the vertical blanking interval; and the means for inserting second data into the second vertical blanking interval line of consecutive video frames comprises means for inserting data into field 1 line 21 of the vertical blanking interval.

12. The apparatus of claim 9 wherein:

the first number is in the range of 45 to 55; and the second number is in the range of 140–160.

13. A method for inserting data into vertical blanking interval lines of video frames, the method comprising the steps of:

testing whether first data is being inserted into a first vertical blanking interval line; and inserting second data into a vertical blanking interval line adjacent to the first vertical blanking interval line in 2X format rather than 1X format, if first data is being inserted into the first vertical blanking interval line.

14. The method of claim 13 wherein the first data comprises closed caption data and wherein the step of testing whether first data is being inserted into the first vertical blanking interval line comprises the step of:

testing whether closed caption data is being inserted into field 1 line 21 of the vertical blanking interval.

15. An apparatus for inserting data into vertical blanking interval lines of video frames, the apparatus comprising:

means for testing whether first data is being inserted into a first vertical blanking interval line; and means for inserting second data into a vertical blanking interval line adjacent to the first vertical blanking interval line in 2X format rather than 1X format, if first data is being inserted into the first vertical blanking interval line.

16. The apparatus of claim 15 wherein the first data comprises closed caption data and wherein the means for testing whether data is being inserted into the first vertical blanking interval line comprises:

means for testing whether closed caption data is being inserted into field 1 line 21 of the vertical blanking interval.

17. A method for inserting data into a vertical blanking interval line of video frames, the method comprising the steps of:

inserting first data into a first vertical blanking interval line in a first field for a plurality of consecutive video frames;

counting a number of consecutive video frames having first data inserted into the first vertical blanking interval line in the first field;

terminating the insertion of first data for a first number of video frames before again inserting first data into the first vertical blanking interval line in the first field when the counted number of consecutive video frames into which first data is inserted into the first vertical blanking interval line equals a second number;

inserting second data into a second vertical blanking interval line in a second field for a plurality of consecutive video frames, the second vertical blanking line being a same line number as a line number for the first vertical blanking line number;

detecting when the insertion of second data into the second vertical blanking interval line in the second field terminates;

terminating for a second number of video frames the insertion of first data into the first vertical blanking interval line in the first field upon detecting the termination of insertion of the second data into the second vertical blanking interval line; and repeating the steps.

18. The method of claim 17 further comprising the steps of:

testing whether second data is being inserted into the second vertical blanking interval line; and inserting third data into a vertical blanking interval line in the second field adjacent to the second vertical blanking interval line in 2X format rather than 1X format, if second data is being inserted into the second vertical blanking interval line in the second field.

19. The method of claim 18 wherein:

the first data is extended data services (EDS) data; and the second data is closed caption data.

20. The method of claim 19 wherein:

the step of inserting EDS data into the first vertical blanking interval line in the first field of consecutive video frames comprises the step of inserting data into field 2 line 21 of the vertical blanking interval; and the step of inserting closed caption data into the second vertical blanking interval line in the first field of consecutive video frames comprises the step of inserting data into field 1 line 21 of the vertical blanking interval.

21. The method of claim 20 wherein:

the step of inserting third data into a vertical blanking interval line in the second field adjacent to the second vertical blanking interval line in 2X format rather than 1X format, if closed caption data is being inserted into the second vertical blanking interval line in the second field comprises the steps of inserting third data into field 1 line 19, 20, 22 or 23 of the vertical blanking interval.

22. The method of claim 17 wherein:

the step of detecting when the insertion of second data into a second vertical blanking interval line terminates comprises the steps of detecting when the insertion of closed caption data terminates; and the step of terminating comprises the step of terminating within 3 frames of detecting when the insertion of closed caption data terminates.

23. The method of claim 17 wherein:

the first number of video frame is in the range of 45 to 55; and the second number of video frames is in the range of 140–160.

24. An apparatus for inserting data into a vertical blanking interval line of video frames, the apparatus comprising:

means for inserting first data into a first vertical blanking interval line in a first field for a plurality of consecutive video frames;

means for counting a number of consecutive video frames having first data inserted into the first vertical blanking interval line in the first field;

means for terminating the insertion of first data for a first number of video frames before again inserting first data into the first vertical blanking interval line in the first field when the counted number of consecutive video frames into which first data is inserted into the first vertical blanking interval line equals a second number;

means for inserting second data into a second vertical blanking interval line in a second field for a plurality of consecutive video frames, the second vertical blanking line being a same line number as a line number for the first vertical blanking line number;

means for detecting when the insertion of second data into the second vertical blanking interval line in the second field terminates; and means for terminating for a second number of video frames the insertion of first data into the first vertical blanking interval line in the first field upon detecting the termination of insertion of the second data into the second vertical blanking interval line.

25. The apparatus of claim 24 further comprising:

means for testing whether second data is being inserted into the second vertical blanking interval line; and means for inserting third data into a vertical blanking interval line in the second field adjacent to the second vertical blanking interval line in 2X format rather than 1X format, if second data is being inserted into the second vertical blanking interval line in the second field.

26. The apparatus of claim 25 wherein:

the first data is extended data services (EDS) data; and the second data is closed caption data.

27. The apparatus of claim 26 wherein:

the means for inserting EDS data into the first vertical blanking interval line in the first field of consecutive video frames comprises means for inserting data into field 2 line 21 of the vertical blanking interval; and the means for inserting closed caption data into the second vertical blanking interval line in the first field of consecutive video frames comprises means for inserting data into field 1 line 21 of the vertical blanking interval.

28. The apparatus of claim 27 wherein:

the means for inserting third data into a vertical blanking interval line in the second field adjacent to the second vertical blanking interval line in 2X format rather than 1X format, if closed caption data is being inserted into the second vertical blanking interval line in the second field comprises means for inserting third data into field 1 line 19, 20, 22 or 23 of the vertical blanking interval.

29. The apparatus of claim 24 wherein:

the means for detecting when the insertion of second data into a second vertical blanking interval line terminates comprises means for detecting when the insertion of closed caption data terminates; and the means for terminating comprises means for terminating within 3 frames of detecting when the insertion of closed caption data terminates.

30. The apparatus of claim 24 wherein:

the first number of video frame is in the range of 45 to 55; and the second number of video frames is in the range of 140–160.

* * * * *